(No Model.)
F. O. BUTTERFIELD.
STRAINER FOR FUNNELS, &c.
No. 324,080. Patented Aug. 11, 1885.
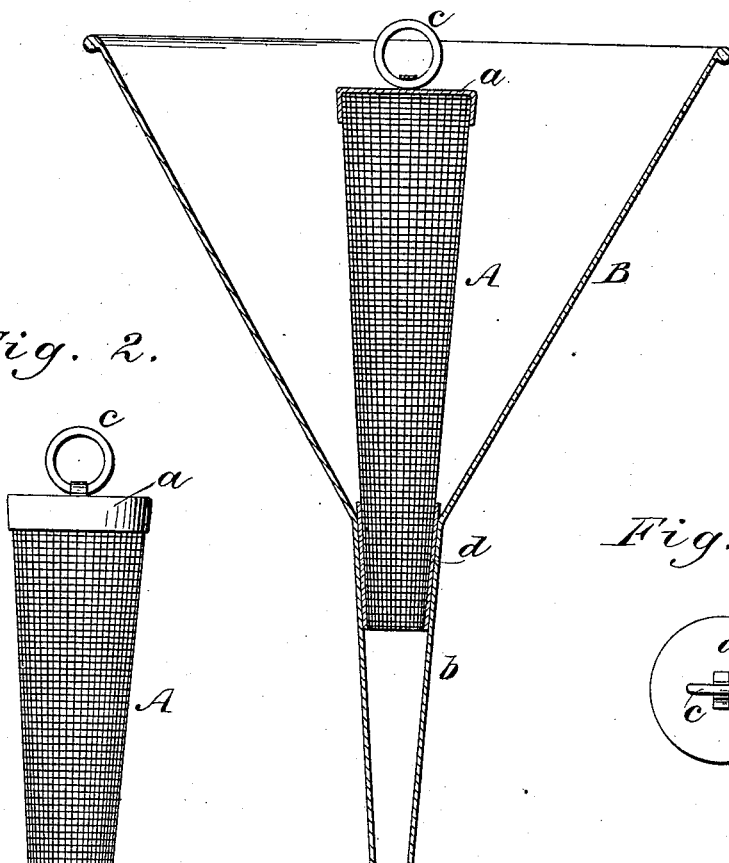
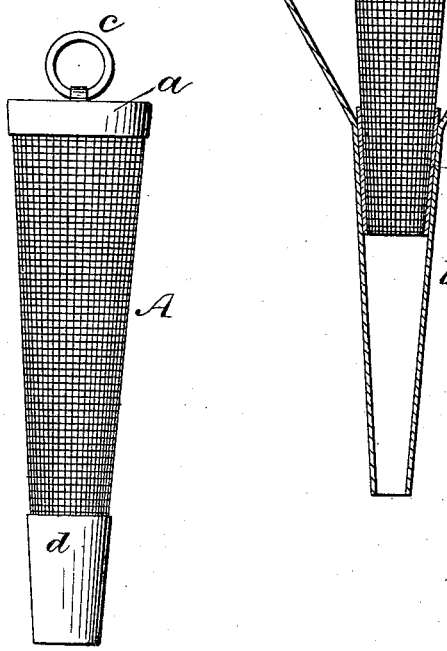
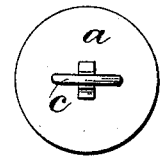
WITNESSES:
INVENTOR:
F. O. Butterfield
BY Munn & Co
ATTORNEYS.

United States Patent Office.

FRANCIS O. BUTTERFIELD, OF LYNN, MASSACHUSETTS.

STRAINER FOR FUNNELS, &c.

SPECIFICATION forming part of Letters Patent No. 324,080, dated August 11, 1885.

Application filed June 1, 1885. (No model.)

*To all whom it may concern:*

Be it known that I, FRANCIS O. BUTTERFIELD, of Lynn, in the county of Essex and State of Massachusetts, have invented a new and Improved Strainer for Funnels, &c., of which the following is a full, clear, and exact description.

My invention consists of a cheap and convenient device to be fitted in the tubes of funnels to strain the liquid passed through the funnel and to prevent clogging of the funnel.

Reference is to be had to the accompanying drawings, forming part of this specification, in which similar letters of reference indicate corresponding parts in all the figures.

Figure 1 is a sectional elevation of an ordinary funnel having my funnel-strainer applied thereto. Fig. 2 is a side elevation of the strainer removed from the funnel, and Fig. 3 is a plan view of the strainer.

A represents my new funnel-strainer placed in the tube $b$ of the funnel B. The strainer A is by preference made of wire-cloth rolled into tubular form and made slightly tapering to fit tightly in tube $b$ and to fit tubes of different sizes. The upper or larger end of the strainer is closed by the sheet-metal cap $a$, which is provided with the ring $c$, by which the strainer may be conveniently handled and hung up when not in use. The lower end of the strainer is open, and is provided with the sheet-metal thimble $d$, which protects the wire-cloth from wear and fits snugly in the tube $b$, so that no liquid can pass into the tube $b$ except through the wire-cloth.

By the use of this device any liquid may be strained while being poured through the funnel, and all danger of the funnel-tube $b$ becoming clogged is avoided.

The device is applicable for use in the waste-pipes of sinks and in various other places.

Having thus described my invention, I claim as new and desire to secure by Letters Patent—

1. As an improved article of manufacture, a strainer for ordinary funnels consisting of the tubular tapering wire-cloth strainer A and the tubular tapering thimble $d$, inclosing the lower end of the strainer, open at both ends, and adapted by its taper to fit the spouts of various-sized funnels, the taper of the said thimble and strainer being less than the taper of a funnel, whereby, when placed in a funnel, a space will be left between said strainer and funnel to receive the liquid, substantially as set forth.

2. A strainer for ordinary funnels, consisting of the tubular tapering wire-cloth strainer A of less taper than an ordinary funnel, a cap, $a$, closing the upper end of said strainer, and the tubular tapering thimble $d$, open at both ends and inclosing the lower open end of the strainer, thereby strengthening the same, whereby the entrance of unstrained liquid through the top of the strainer will be prevented and the tapering thimble allow of the strainer being used with various-sized funnels.

3. The strainer herein shown and described, consisting of the slightly-tapered tubular wire-cloth A, the closed cap $a$ thereon, the ring $c$, secured to said cap, and the tubular tapering thimble inclosing and strengthening the lower open end of the strainer, substantially as and for the purpose set forth.

FRANCIS O. BUTTERFIELD.

Witnesses:
EDWARD WILLIAMS,
FRANK H. FRIZZELL.